United States Patent
Liang et al.

(10) Patent No.: US 11,914,333 B2
(45) Date of Patent: Feb. 27, 2024

(54) MACHINE LEARNING DEVICE, SERVO CONTROL DEVICE, SERVO CONTROL SYSTEM, AND MACHINE LEARNING METHOD

(71) Applicant: FANUC CORPORATION, Yamanashi (JP)

(72) Inventors: Yao Liang, Yamanashi (JP); Ryoutarou Tsuneki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 59 days.

(21) Appl. No.: 17/002,110

(22) Filed: Aug. 25, 2020

(65) Prior Publication Data

US 2021/0072710 A1    Mar. 11, 2021

(30) Foreign Application Priority Data

Sep. 5, 2019  (JP) ................. 2019-161883

(51) Int. Cl.
*G05B 13/02* (2006.01)
*G05B 19/414* (2006.01)

(52) U.S. Cl.
CPC ....... *G05B 13/0265* (2013.01); *G05B 19/414* (2013.01); *G05B 2219/34013* (2013.01)

(58) Field of Classification Search
CPC .............. G05B 13/0265; G05B 19/414; G05B 2219/34013; G05B 19/4142
See application file for complete search history.

(56) References Cited

U.S. PATENT DOCUMENTS

| 2015/0148952 | A1* | 5/2015 | Shiratsuchi | ............ B25J 9/1682 901/3 |
| 2017/0153614 | A1* | 6/2017 | Namie | ................. G05B 19/048 |
| 2017/0154283 | A1* | 6/2017 | Kawai | .................... G06F 11/006 |
| 2018/0364678 | A1* | 12/2018 | Ikai | ....................... G05B 19/404 |

FOREIGN PATENT DOCUMENTS

| JP | 8-314517 | 11/1996 |
| JP | 2001-100819 | 4/2001 |
| JP | 2017-102617 | 6/2017 |
| JP | 2019-003404 | 1/2019 |
| JP | 2019-8472 | 1/2019 |

* cited by examiner

*Primary Examiner* — Kenneth M Lo
*Assistant Examiner* — Mohammed Shafayet
(74) *Attorney, Agent, or Firm* — Wenderoth, Lind & Ponack, L.L.P.

(57) ABSTRACT

A machine learning device performs machine learning with respect to a plurality of servo control units corresponding to a plurality of axes. A first servo control unit related to an axis receiving interference includes a compensation unit that compensates for at least one of a position error, a velocity command, and a torque command of the first servo control unit based on at least one of a variable related to a position command and a variable related to position feedback information of a second servo control unit related to an axis generating the interference. The machine learning device acquires state information including first and second servo control information and a coefficient of the function, outputs action information and a reward value for reinforcement learning, and updates a value function on the basis of the reward value, the state information, and the action information.

9 Claims, 8 Drawing Sheets

POSITION VARIATIONS ALONG LINEAR AXIS IS IMPROVED

MACHINE LEARNING DEVICE, SERVO CONTROL DEVICE, SERVO CONTROL SYSTEM, AND MACHINE LEARNING METHOD

This application is based on and claims the benefit of priority from Japanese Patent Application No. 2019-161883, filed on 5 Sep. 2019, the content of which is incorporated herein by reference.

BACKGROUND OF THE INVENTION

Field of the Invention

The present invention relates to a machine learning device, a servo control device and a servo control system each including the machine learning device, and a machine learning method thereof, for performing machine learning with respect to a plurality of servo control units configured to control a plurality of motors configured to drive a machine having one axis among a plurality of axes receiving interference generated by movement along at least one of the other axes.

Related Art

For example, Patent Document 1 and Patent Document 2 disclose a device having a plurality of servo control units configured to control a plurality of motors configured to drive a machine having a plurality of axes. Patent Document 1 discloses a control device related to a machine tool, a robot, or an industrial machine, including a first motor control unit configured to control a first motor for driving along a first axis, and a second motor control unit configured to control a second motor for driving along a second axis extending in a different direction from the direction of the first axis. Patent Document 1 discloses an evaluation program for making the first and second motor control units operate to evaluate operation characteristics related to the control device. The evaluation program makes the first and second motor control units control the first and second motors, so as to move a control object along the first and second axes, tracing a movement path including at least a shape having a corner at which the rotation directions of the first and second motors are not reversed and a curved shape on which one of the first and second motors rotates in one direction, and the rotation direction of the other of the first and second motors is reversed.

Patent Document 2 discloses a position driving control system including one position command control device and a position driving control device having a plurality of position driving control units disposed for every servo motor, and receiving a position command issued by the position command control device. The position driving control system has a shared memory for storing control state data of respective axes. In the position driving control system, each of the plurality of position driving control units has an inter-axial correction velocity/torque control unit configured to, when a plurality of axes are subjected to synchronization/tuning control, acquire the control state data of other axes from the shared memory and calculate an inter-axial correction command value according to a variation in load on other axes, to correct a command value of its own axis on the basis of the inter-axial correction command value calculated by the inter-axial correction velocity/torque control unit.

Patent Document 1: Japanese Unexamined Patent Application, Publication No. 2019-003404
Patent Document 2: Japanese Unexamined Patent Application, Publication No. 2001-100819

SUMMARY OF THE INVENTION

When a plurality of servo control units control a plurality of motors for driving along a plurality of axes, and where one servo control unit performs driving along one axis, the driving along the one axis may interfere with the driving along another axis by another servo control unit, in some cases. It is desired for the interference to be compensated for in order to provide higher command followability of the servo control unit receiving the interference.

(1) In a first aspect of the present disclosure, a machine learning device is configured to perform machine learning with respect to a plurality of servo control units configured to control a plurality of motors configured to drive a machine having a plurality of axes, with one axis among the plurality of axes receiving interference generated by movement along at least one of the other axes. A first servo control unit related to the one axis receiving the interference among the plurality of servo control units includes a compensation unit configured to obtain a compensation value for compensating for at least one of a position error, a velocity command, and a torque command of the first servo control unit on the basis of a function including at least one of a variable related to a position command and a variable related to position feedback information of a second servo control unit related to the axis generating the interference. The machine learning device includes a state information acquisition unit configured to acquire state information including first servo control information of the first servo control unit, second servo control information of the second servo control unit, and a coefficient of the function,
an action information output unit configured to output action information including adjustment information of the coefficient included in the state information to the compensation unit,
a reward output unit configured to output a reward value for reinforcement learning using an evaluation function serving as a function of the first servo control information, and
a value function updating unit configured to update a value function on the basis of the reward value output by the reward output unit, the state information, and the action information.

(2) In a second aspect of the present disclosure, a servo control device includes the machine learning device according to (1) above, and
a plurality of servo control units configured to control a plurality of motors configured to drive a machine having a plurality of axes, with one axis among the plurality of axes receiving interference generated by movement along at least one of the other axes. A first servo control unit related to the one axis receiving the interference among the plurality of servo control units includes a compensation unit configured to obtain a compensation value for compensating for at least one of a position error, a velocity command, and a torque command of the first servo control unit on the basis of a function including at least one of a variable related to a position command and a variable related to position feedback information of a second servo control unit related to the axis generating the interference. The machine learning device outputs action information including adjustment information of the coefficient to the compensation unit.

(3) In a third aspect of the present disclosure, a servo control system includes the machine learning device according to (1) above, and
a servo control device including a plurality of servo control units configured to control a plurality of motors configured to drive a machine having a plurality of axes, with one axis among the plurality of axes receiving interference generated by movement along at least one of the other axes. A first servo control unit related to the one axis receiving the interference among the plurality of servo control units includes a compensation unit configured to obtain a compensation value for compensating for at least one of a position error, a velocity command, and a torque command of the first servo control unit on the basis of a function including at least one of a variable related to a position command and a variable related to position feedback information of a second servo control unit related to the axis generating the interference. The machine learning device outputs action information including adjustment information of the coefficient to the compensation unit.

(4) In a fourth aspect of the present disclosure, a machine learning method is executed by a machine learning device configured to perform machine learning with respect to a plurality of servo control units configured to control a plurality of motors configured to drive a machine having a plurality of axes, with one axis among the plurality of axes receiving interference generated by movement along at least one of the other axes. A first servo control unit related to the one axis receiving the interference among the plurality of servo control units includes a compensation unit configured to obtain a compensation value for compensating for at least one of a position error, a velocity command, and a torque command of the first servo control unit on the basis of a function including at least one of a variable related to a position command and a variable related to position feedback information of a second servo control unit related to the axis generating the interference. The machine learning method includes the steps of acquiring state information including first servo control information of the first servo control unit, second servo control information of the second servo control unit, and a coefficient of the function, outputting action information including adjustment information of the coefficient included in the state information to the compensation unit,
outputting a reward value for reinforcement learning using an evaluation function serving as a function of the first servo control information, and
updating a value function on the basis of the reward value, the state information, and the action information.

In the respective aspects of the present disclosure, the servo control unit related to the axis receiving the interference is capable of compensating for the interference between axes while avoiding complicated adjustments, thereby providing higher command followability.

DETAILED DESCRIPTION OF THE INVENTION

Hereinafter, some embodiments of the present disclosure will be described in detail with reference to the drawings.

First Embodiment

Figure 1:
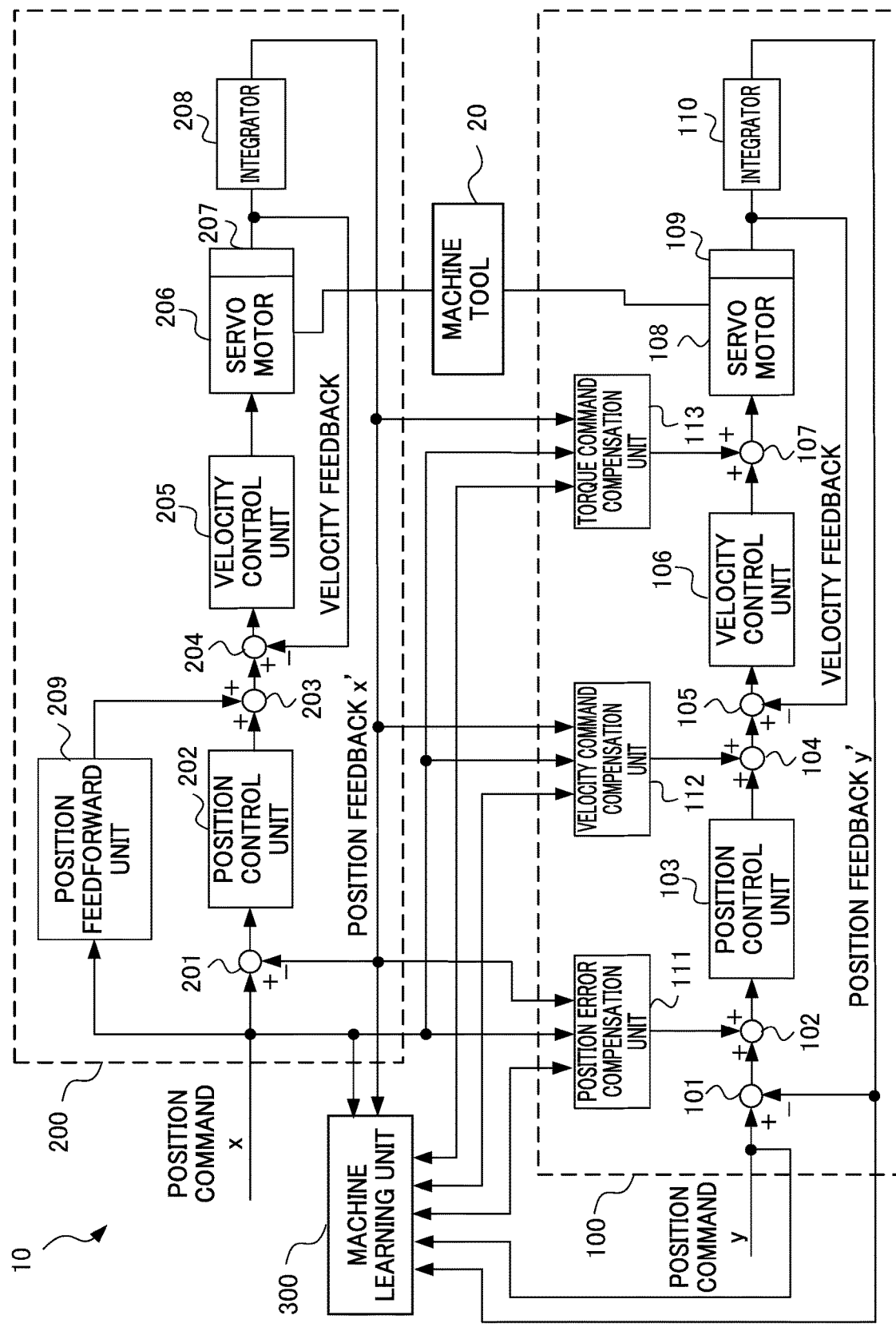
FIG. 1 is a block diagram illustrating a servo control device according to a first embodiment of the present disclosure.

FIG. 1 is a block diagram illustrating a servo control device according to the first embodiment of the present disclosure. As shown in FIG. 1, a servo control device 10 includes a servo control unit 100, a servo control unit 200, and a machine learning unit 300. The machine learning unit 300 serves as a machine learning device. The machine learning unit 300 may be disposed in the servo control unit 100 or the servo control unit 200. A machine tool 20 is driven by the servo control units 100, 200. In the description below, the machine tool 20 serves as an object to be controlled by the servo control units 100 and 200. A machine to be controlled is not limited to such a machine tool. For example, a robot or an industrial machine may be controlled. The servo control units 100 and 200 may be disposed as a part of a machine such as a machine tool, a robot, or an industrial machine.

The servo control units 100 and 200 control two axes of the machine tool 20. The machine tool is, for example, a 3-axis machine tool, a 4-axis machine tool, or a 5-axis machine tool. The two axes are, for example, two linear axes of a Y axis and a Z axis, or a linear axis and a rotary axis of an X axis and a B axis. The specific configuration of the machine tool 20 will be described later.

The servo control unit 100 includes a subtractor 101, an adder 102, a position control unit 103, an adder 104, a subtractor 105, a velocity control unit 106, an adder 107, a servo motor 108, a rotary encoder 109, an integrator 110, a position error compensation unit 111, a velocity command compensation unit 112, and a torque command compensation unit 113. The servo control unit 200 includes a subtractor 201, a position control unit 202, an adder 203, a subtractor 204, a velocity control unit 205, a servo motor 206, a rotary encoder 207, an integrator 208, and a position feedforward unit 209. The servo control unit 100 corresponds to a first servo control unit related to the axis receiving interference, while the servo control unit 200 corresponds to a second servo control unit related to the axis generating the interference.

The servo control unit 100 is different from the servo control unit 200 in that the servo control unit 100 includes the position error compensation unit 111, the velocity command compensation unit 112, and the torque command compensation unit 113. When the servo control unit 200 drives the machine tool 20 along one axis, the driving along the one axis interferes with driving along the other axis by the servo control unit 100. Therefore, the servo control unit 100 is configured with the position error compensation unit 111, the velocity command compensation unit 112, and the torque command compensation unit 113, so as to compensate for the interference by the driving of the one axis. The position feedforward unit 209 is disposed in the servo control unit 200 in FIG. 1, or alternatively may not be disposed. Alternatively, the position feedforward unit 209 may be disposed in the servo control unit 100, or may be disposed in both the servo control unit 100 and the servo control unit 200.

Hereinafter, the respective units included in the servo control device 10 and the machine tool 20 will be further described. First, the servo control unit 200 related to the axis generating the interference will be described. It is noted that the servo control unit 100 related to the axis receiving the interference will be described later.

<Servo Control Unit 200>

A position command x is generated by an upper control device, an external input device, or the like so as to change a pulse frequency in order to change the velocity of the servo motor 206 according to a predetermined machining program. The position command x serves as a control command. The position command x is output to the subtractor 201, the position feedforward unit 209, the position error compensation unit 111, the velocity command compensation unit 112, the torque command compensation unit 113, and the machine learning unit 300.

The subtractor 201 obtains a difference between the position command x and a position-feedback (position FB) detection position (corresponding to position feedback information x') and outputs the difference to the position control unit 202 as a position error.

The position control unit 202 outputs a value obtained by multiplying the position error by a position gain Kp to the adder 203 as a velocity command.

The adder 203 adds the velocity command and the value (a position feedforward term) output by the position feedforward unit 209 and outputs an addition result to the subtractor 204 as a feedforward-controlled velocity command. The subtractor 204 obtains a difference between the value output by the adder 203 and a feedback velocity detection value and outputs the difference to the velocity control unit 205 as a velocity error.

The velocity control unit 205 adds a value obtained by multiplying and integrating the velocity error by an integral gain K1$v$ and a value obtained by multiplying the velocity error by a proportional gain K2$v$ and outputs an addition result to the servo motor 206 as a torque command. The integrator 208 integrates the velocity detection value output by the rotary encoder 207 and outputs an integration result as a position detection value. The rotary encoder 207 outputs the velocity detection value to the subtractor 204 as velocity feedback information. The integrator 208 obtains a position detection value from the velocity detection value and outputs the position detection value to the subtractor 201 as position feedback (position FB) information x'. The position feedback (position FB) information x' is also output to the machine learning unit 300, the position error compensation unit 111, the velocity command compensation unit 112, and the torque command compensation unit 113. Each of the rotary encoder 207 and the integrator 208 serves as a detector, and the servo motor 206 may be a motor configured to perform rotary movement or may be a linear motor configured to perform linear movement.

The position feedforward unit 209 obtains a value by differentiating the position command value and multiplying a differentiation result by a constant value, and obtains a value by multiplying the above value by a position feedforward coefficient, and thereafter outputs the resultant value to the adder 203 as a position feedforward term. The servo control unit 200 is configured in this manner.

<Servo Control Unit 100>

A position command y is generated by an upper control device, an external input device or the like so as to change a pulse frequency in order to change the velocity of the servo motor 108 according to a predetermined machining program. The position command y serves as a control command. The position command y is output to the subtractor 101 and the machine learning unit 300.

The subtractor 101 obtains a difference between the position command y and a position-feedback detection position (corresponding to position feedback information y') and outputs the difference to the adder 102 as a position error. The adder 102 obtains a difference between the position error and a position error compensation value output by the position error compensation unit 111 and outputs the difference to the position control unit 103 as a compensated position error.

The position control unit 103 outputs a value obtained by multiplying the compensated position error by a position gain Kp to the adder 104 as a velocity command.

The adder 104 obtains a difference between the velocity command and a velocity command compensation value output by the velocity command compensation unit 112 and outputs the difference to the subtractor 105 as a compensated velocity command. The subtractor 105 obtains a difference between the value output by the adder 104 and a feedback velocity detection value and outputs the difference to the velocity control unit 106 as a velocity error.

The velocity control unit 106 adds a value obtained by multiplying and integrating the velocity error by the integral gain K1$v$ and a value obtained by multiplying the velocity error by the proportional gain K2$v$ and outputs an addition result to the adder 107 as a torque command. The adder 107 obtains a difference between the torque command and a torque command compensation value output by the torque command compensation unit 113 and outputs the difference to the servo motor 108 as a compensated torque command.

The integrator 110 integrates the velocity detection value output by the rotary encoder 109 and outputs the integration result as a position detection value. The rotary encoder 109 outputs the velocity detection value to the subtractor 105 as velocity feedback information. The integrator 110 obtains the position detection value from the velocity detection value and outputs the position detection value to the subtractor 101 and the machine learning unit 300 as position feedback information y'. Each of the rotary encoder 109 and the integrator 110 serves as a detector, and the servo motor 108 may be a motor configured to perform rotary movement or may be a linear motor configured to perform linear movement.

The position error compensation unit 111 receives the position feedback information x' output by the integrator 208 of the servo control unit 200, the position command x input into the servo control unit 200, and the change amounts of coefficients $a_1$ to $a_6$ in the function represented as Expression 1 (hereinafter referred to as Math. 1) below output by the machine learning unit 300, obtains a position error compensation value $Err_{comp}$ by use of Expression 1, and outputs the resultant value to the adder 102.

$$Err_{comp} = a_1 \frac{d^2x}{dt^2} + a_2 \frac{dx}{dt} + a_3 x + a_4 \frac{d^2x'}{dt^2} + a_5 \frac{dx'}{dt} + a_6 x' \quad \text{[Math. 1]}$$

The velocity command compensation unit 112 receives the position feedback information x' output by the integrator 208 of the servo control unit 200, the position command x input into the servo control unit 200, and the change amounts of coefficients $b_1$ to $b_6$ in the function represented as Expression 2 (hereinafter referred to as Math. 2) below output by the machine learning unit 300, obtains a velocity command compensation value $Vcmd_{comp}$ by use of Expression 2, and outputs the resultant value to the adder 104.

$$Vcmd_{comp} = b_1 \frac{d^2x}{dt^2} + b_2 \frac{dx}{dt} + b_3 x + b_4 \frac{d^2x'}{dt^2} + b_5 \frac{dx'}{dt} + b_6 x' \quad \text{[Math. 2]}$$

The torque command compensation unit 113 receives the position feedback information x' output by the integrator 208 of the servo control unit 200, the position command x input into the servo control unit 200, and the change amounts of coefficients $c_1$ to $c_6$ in the function represented as Expression 3 (hereinafter referred to as Math. 3) below output by the machine learning unit 300, obtains a torque command compensation value $Tcmd_{comp}$ by use of Expression 3, and outputs the resultant value to the adder 107.

$$Tcmd_{comp} = c_1 \frac{d^2x}{dt^2} + c_2 \frac{dx}{dt} + c_3 x + c_4 \frac{d^2x'}{dt^2} + c_5 \frac{dx'}{dt} + c_6 x' \quad \text{[Math. 3]}$$

The position error compensation unit 111, the velocity command compensation unit 112, and the torque command compensation unit 113 correspond to compensation units and use the position command x and the position feedback information x' of the servo control unit 200 to obtain the position error compensation value $Err_{comp}$, the velocity command compensation value $Vcmd_{comp}$, and the torque command compensation value $Tcmd_{comp}$ of the servo control unit 100. The scalar values of the compensation value $Err_{comp}$, the velocity command compensation value $Vcmd_{comp}$, and the torque command compensation value $Tcmd_{comp}$ regardless of the directions thereof are added to the position error, the velocity command, and the torque command of the servo control unit 100, respectively. In this way, the amounts of the interference caused by the driving along the axis by the servo control unit 200 can be reduced from the position error, the velocity command, and the torque command of the servo control unit 100. The servo control unit 100 may not include all of the position error compensation unit 111, the velocity command compensation unit 112, and the torque command compensation unit 113, but may include one or two of the position error compensation unit 111, the velocity command compensation unit 112, and the torque command compensation unit 113, as necessary.

It is noted that Expressions 1 to 3 respectively include, as variables, the position command x, the differentiated value of the position command x, the double-differentiated value of the position command x, the position feedback information x', the differentiated value of the position feedback information x', and the double-differentiated value of the position feedback information x'. Alternatively, Expressions 1 to 3 may not include all of these variables, but may include one or more of these, as appropriate. For example, the position error compensation value $Err_{comp}$, the velocity command compensation value $Vcmd_{comp}$, and the torque command compensation value $Tcmd_{comp}$ may be obtained by use of the double-differentiated value of the position command x and the double-differentiated value of the position feedback information x', that is, the acceleration of the position command x and the acceleration of the position feedback information x'. The position command x, the differentiated value of the position command x, and the double-differentiated value of the position command x respectively correspond to variables related to the position command, and the position feedback information x', the differentiated value of the position feedback information x' and the double-differentiated value of the position feedback information x' respectively correspond to variables related to the position feedback information. The servo control unit 100 is configured in this manner.

<Machine Tool 20>

Figure 2:
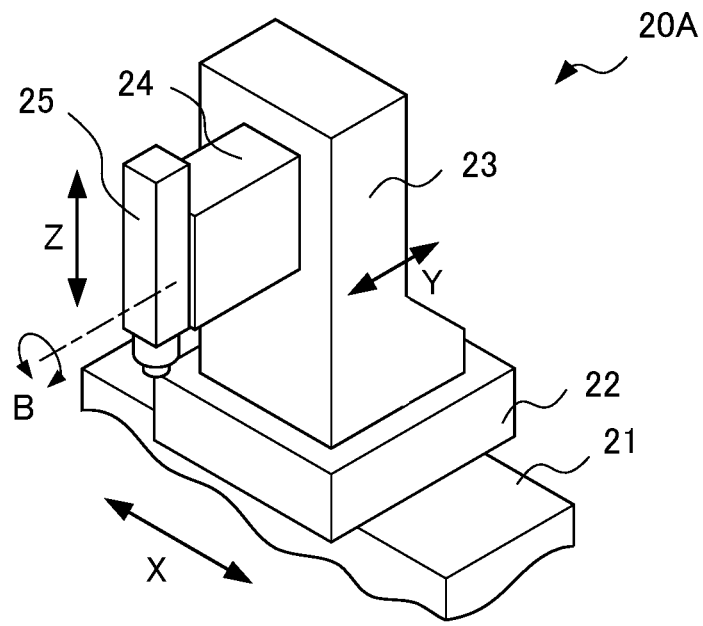
FIG. 2 is a configuration diagram partially illustrating a main spindle moving mechanism configured to move a main spindle of a 4-axis machine tool serving as a machine tool.
Figure 3:
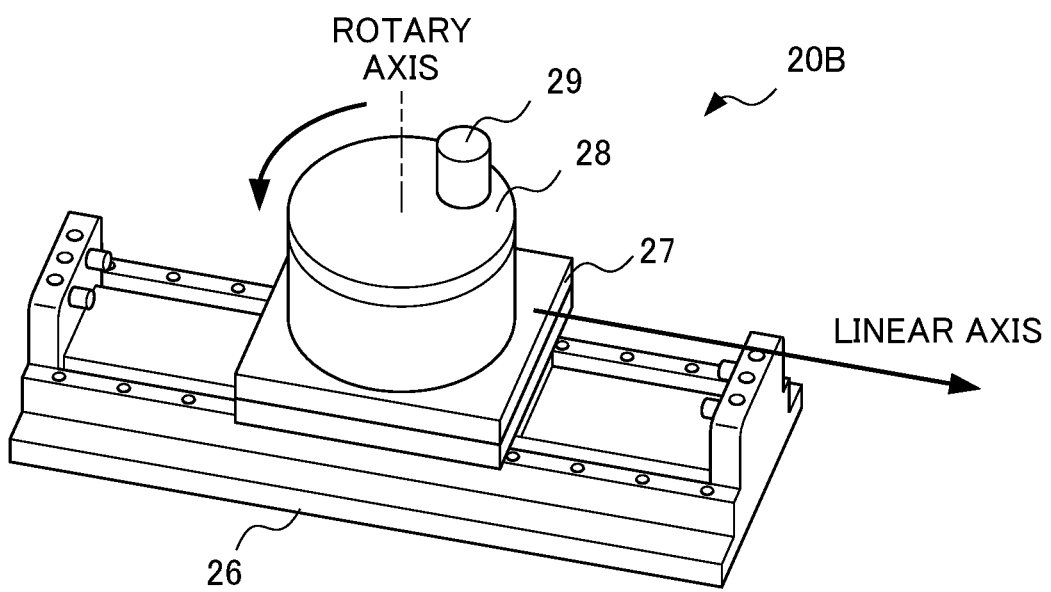
FIG. 3 is a configuration diagram partially illustrating a table mechanism of a 5-axis machine tool serving as a machine tool, on which a workpiece is mounted.

The machine tool 20 is, for example, a 3-axis machine tool, a 4-axis machine tool, or a 5-axis machine tool. FIG. 2 is a configuration diagram partially illustrating a main spindle moving mechanism configured to move a main spindle of a 4-axis machine tool. FIG. 3 is a configuration diagram partially illustrating a table mechanism of a 5-axis machine tool on which a workpiece is mounted. When a 4-axis machine tool 20A shown in FIG. 2 serves as the machine tool 20, the servo control unit 200 controls the linear movement along the Y axis, and the servo control unit 100 controls the linear movement along the Z axis, for example. In this case, the servo control unit 200 corresponds to the servo control unit related to the axis generating interference, while the servo control unit 100 corresponds to the servo control unit related to the axis receiving the interference.

As shown in FIG. 2, an X-axis moving table 22 is mounted movably in the X-axis direction on a stationary table 21, and a Y-axis moving column 23 is mounted movably in the Y-axis direction on the X-axis moving table 22. A main spindle mounting stand 24 is attached to the side face of the Y-axis moving column 23. A main spindle 25 is mounted rotatably about the B axis and movably in the Z-axis direction, to the main spindle mounting stand 24. For example, the main spindle 25 receives interference in the driving along the Z-axis direction from the Y axis during acceleration/deceleration in the Y-axis direction of the Y-axis moving column 23.

When a 5-axis machine tool 20B shown in FIG. 3 serves as the machine tool 20, the servo control unit 200 controls rotary movement about a rotary axis, and the servo control unit 100 controls linear movement along the X axis corresponding to a linear axis, for example. As shown in FIG. 3, when a rotary indexing table 28 with an eccentric load has the rotary axis placed on the linear axis, the axes affect each other and interference occurs. To eliminate the interference, at least one of the servo control unit 100 and the servo control unit 200 is equipped with a compensation unit. In the present embodiment, the servo control unit 100 is equipped with, as compensation units, the position error compensation unit 111, the velocity command compensation unit 112, and the torque command compensation unit 113. As with the 4-axis machine tool 20A shown in FIG. 2, the servo control unit 200 corresponds to the servo control unit related to the axis generating interference, while the servo control unit 100 corresponds to the servo control unit related to the axis receiving the interference. The position command input into the servo control unit 200 is a command for specifying a rotation angle of the rotary axis.

As shown in FIG. 3, an X-axis moving table 27 is mounted movably in the X-axis direction on a stationary table 26, and the rotary indexing table 28 is mounted rotatably on the X-axis moving table 27. In some cases, an eccentric load 29 may be formed at a position shifted from the center of the rotary axis due to the influence of a workpiece or a workpiece holding tool mounted on the rotary indexing table 28. When the eccentric load 29 is formed, the X-axis moving table 27 and the rotary indexing table 28 interfere with each other.

The servo control unit 100 and the servo control unit 200 in the case of the 4-axis machine tool 20A shown in FIG. 2 to be driven respectively have the same configurations as those in the case of the 5-axis machine tool 20B shown in FIG. 3 to be driven. However, the values of the coefficients $a_1$ to $a_6$ in Expression 1 of the position error compensation unit 111 of the servo control unit 100, the coefficients $b_1$ to $b_6$ in Expression 2 of the velocity command compensation unit 112, and the coefficients $c_1$ to $c_6$ in Expression 3 of the torque command compensation unit 113 in the case of the 4-axis machine tool 20A shown in FIG. 2, in which movement along the Y axis interferes with movement along the Z axis, are different from those in the case of the 5-axis machine tool 20B shown in FIG. 3, in which movement about the rotary axis and movement along the X axis interfere with each other.

<Machine Learning Unit 300>

The machine learning unit 300 executes a predetermined machining program (hereinafter also referred to as a "machining program during learning") to perform machine learning (hereinafter referred to as learning) on the coefficients $a_1$ to $a_6$ of the position error compensation unit 111, the coefficients $b_1$ to $b_6$ of the velocity command compensation unit 112, and the coefficients $c_1$ to $c_6$ of the torque command compensation unit 113 by using the position command y and the position feedback (position FB) information y output by the servo control unit 100. The machine learning unit 300 serves as a machine learning device. The machine learning unit 300 performs learning before shipment and may perform re-learning after the shipment. In the description below, the 4-axis machine tool 20A serves as the machine tool 20. The servo control unit 200 controls the servo motor 206 by the machining program during learning, and the servo motor 206 drives the 4-axis machine tool 20A along the Y axis. The servo control unit 100 controls the servo motor 108 by the machining program during learning, and the servo motor 108 drives the 4-axis machine tool 20A along the Z axis. The machining program during learning for driving the 4-axis machine tool 20A simply makes the 4-axis machine tool 20A perform reciprocative movement along the Y axis by controlling the servo control unit 200 for the axis generating interference, regardless of whether or not the 4-axis machine tool 20A is made to perform reciprocative movement along the Z axis by controlling the servo control unit 100 for the axis receiving the interference. The following description is about the case without movement along the Z axis. An upper control device or an external input device outputs, to the servo control unit 200, the position command to make the 4-axis machine tool 20A perform reciprocative movement along the Y axis, and outputs, to the servo control unit 100, the position command to stop movement of the 4-axis machine tool 20A along the Z axis. Even with the input position command to stop movement along the Z axis, the position error, the velocity command, and the torque command are influenced by the interference caused by the movement along the Y axis. Therefore, the machine learning unit 300 learns the coefficients $a_1$ to $a_6$ of the position error compensation unit 111, the coefficients $b_1$ to $b_6$ of the velocity command compensation unit 112, and the coefficients $c_1$ to $c_6$ of the torque command compensation unit 113, to set optimized values of the position error, the velocity command, and the torque command.

Hereinafter, the machine learning unit 300 will be described in further detail. In the following description, although a case in which the machine learning unit 300 performs reinforcement learning is described, the learning performed by the machine learning unit 300 is not particularly limited to reinforcement learning, and the present invention can also be applied to a case in which the machine learning unit 300 performs supervised learning, for example.

Prior to a description of respective functional blocks included in the machine learning unit 300, first, a basic mechanism of reinforcement learning will be described. An agent (corresponding to the machine learning unit 300 in the present embodiment) observes an environment state and selects a certain action. Then, the environment changes on the basis of the action. A certain reward is given according to the environmental change, and the agent learns selections (decisions) for a better action. While supervised learning presents a complete correct answer, the reward in the reinforcement learning often presents a fragmental value based on a change in a portion of the environment. Therefore, the agent learns to select an action so that the total reward in the future is maximized.

In this way, the reinforcement learning learns a method of learning a suitable action on the basis of the mutual effect of an action on the environment (that is, an action for maximizing the reward to be obtained in the future) by learning an action. This represents that, in the present embodiment, such an action that affects the future, for example, an action of selecting action information for compensating for interference between axes in the servo control unit related to the axis receiving the interference, is obtained.

Here, although any learning method may be used as the reinforcement learning, in the description below, Q-learning which is a method of learning a value function Q(S,A) of selecting an action A under a certain state S of the environment will be described as an example. An object of Q-learning is to select an action A having the highest value function Q(S,A) as an optimal action among actions A that can be taken in a certain state S.

However, at an initial time point at which the Q-learning starts, the correct value of the value Q(S,A) is not known at all for a combination of the state S and the action A. Therefore, the agent learns the correct value Q(S,A) by selecting various actions A under a certain state S and making a better selection of actions based on rewards given for the selected actions A.

Since the agent wants to maximize the total reward obtained over the course of the future, the Q-learning aims to attain a relation of $Q(S,A)=E[\Sigma(\gamma^t)r_t]$ in the end. Here, E[ ] indicates an expected value, t indicates time, γ is a parameter called a discount factor to be described later, rt is a reward at time t, and Σ is the sum at time t. In this expression, the expected value is an expected value when the state was changed according to an optimal action. However, since it is unclear which action would be optimal in the process of Q-learning, reinforcement learning is performed while searching for an optimal action by performing various actions. An updating expression of such a value Q(S,A) can be represented by Expression 4 below (indicated as Math. 4 below).

$$Q(S_{t+1}, A_{t+1}) \leftarrow$$
$$Q(S_t, A_t) + \alpha \left( r_{t+1} + \gamma \max_A Q(S_{t+1}, A) - Q(S_t, A_t) \right)$$
[Math. 4]

In Expression 4 above, $S_t$ indicates a state of the environment at the time t, and $A_t$ indicates an action at time t. By the action $A_t$, the state changes to $S_{t+1}$. $r_{t+1}$ indicates a reward obtained by the change in the state. Moreover, a term with max is a multiplication of the value Q by γ when an action A having the highest value Q known at that moment is selected under the state $S_{t+1}$. Here, γ is a parameter of 0<γ≤1 and is called a discount rate. Moreover, α is a learning coefficient and is in the range of 0<α≤1.

Expression 4 described above indicates a method of updating a value $Q(S_t,A_t)$ of an action $A_t$ in a state $S_t$ on the basis of a reward $r_{t+1}$ that was offered in return when the action $A_t$ was performed. This updating expression indicates that if the value $\max_a Q(S_{t+1},A)$ of the best action in the next state $S_{t+1}$ associated with the action $A_t$ is larger than the value $Q(S_t,A_t)$ of the action $A_t$ in the state $S_t$, $Q(S_t,A_t)$ is increased, and if it is smaller, $Q(S_t,A_t)$ is decreased. That is, the updating expression brings the value of a certain action in a certain state close to the value of the best action in the next state associated with the action. However, although the difference differs depending on the discount rate γ and the reward $r_{t+1}$, the value of the best action in a certain state basically propagates to the value of an action in a state previous to that state.

Here, a Q-learning method of creating a value function Q(S,A) table for all state-action pairs (S,A) to perform learning is known. However, it may take a considerably long time for the Q-learning to converge, since the number of states is too large to calculate the Q(S,A) values of all state-action pairs.

Thus, Q-learning may use an existing technique called a deep Q-network (DQN). Specifically, with DQN, the value of the value Q(S,A) is calculated by constructing a value function Q using an appropriate neural network and approximating the value function Q with the appropriate neural network by adjusting the parameters of the neural network. By using DQN, it is possible to shorten the time required for convergence of Q-learning. The details of DQN are disclosed in the Non-Patent Document below, for example.

Non-Patent Document

"Human-level control through deep reinforcement learning", Volodymyr Mnihl [online], [accessed Jan. 17, 2017], Internet <URL: http://files.davidqiu.com/research/nature14236.pdf>

The machine learning unit 300 performs the above-described Q-learning. Specifically, the machine learning unit 300 acquires the set of the position commands x and the set of the position feedback information x' from the servo control unit 200 by executing the machining program during learning. The machine learning unit 300 further acquires the set of the position commands y and the set of the position feedback information y' from the servo control unit 100 by executing the machining program during learning. The position commands y and the position feedback information y' serve as first servo control information, while the position commands x and the position feedback information x' serve as second servo control information. The position command γ is a command to stop movement along the Z axis. The set of the position commands x and the set of the position feedback information x', and the set of the position commands y and the set of the position feedback information y' serve as the state S. The machine learning unit 300 then learns a value Q of selecting an action A of adjusting the values of the coefficients $a_1$ to $a_6$ in Expression 1 of the position error compensation unit 111 of the servo control unit 100, the coefficients $b_1$ to $b_6$ in Expression 2 of the velocity command compensation unit 112, and the coefficients $c_1$ to $c_6$ in Expression 3 of the torque command compensation unit 113, related to the state S.

The servo control unit 200 performs servo control to the servo motor 206 configured to perform driving along the Y axis by executing the machining program during learning. The servo control unit 100, by executing the machining program during learning, performs servo control to the servo motor 108 so as to stop movement along the Z axis on the basis of a position command, while compensating for a position error, a velocity command, and a torque command by using the position error compensation value, the velocity command compensation value, and the torque command compensation value obtained by Expression 1 including the coefficients $a_1$ to $a_6$, Expression 2 including the coefficients $b_1$ to $b_6$, and Expression 3 including the coefficients $c_1$ to $c_6$.

The machine learning unit 300 determines the action A by observing the information of the state S including the set of the position commands x and the set of the position feedback information x', and the set of the position commands y and the set of the position feedback information y', which are acquired by executing the machining program during learning. The machine learning unit 300 gives a reward each time the action A is executed. The machine learning unit 300 searches in a trial-and-error manner for the optimal action A so that the total reward in the future is maximized. By doing so, the machine learning unit 300 can select an optimal action A (that is, the coefficients $a_1$ to $a_6$, the coefficients $b_1$ to $b_6$, and the coefficients $c_1$ to $c_6$) with respect to the state S including the set of the position commands x and the set of the position feedback information x' obtained by executing the machining program during learning, and the set of the position commands y and the set of the position feedback information y' obtained by executing the machining program during learning on the basis of the coefficients $a_1$ to $a_6$, the coefficients $b_1$ to $b_6$, and the coefficients $c_1$ to $c_6$.

That is, the machine learning unit 300 can select such an action A (that is, the coefficients $a_1$ to $a_6$, the coefficients $b_1$ to $b_6$, and the coefficients $c_1$ to $c_6$) that compensates for the interference between the axes generated when the machining program during learning is executed, by selecting such an action A that maximizes the value Q among the actions A applied to the coefficients $a_1$ to $a_6$, the coefficients $b_1$ to $b_6$, and the coefficients $c_1$ to $c_6$ associated with a certain state S on the basis of the value function Q learned by the machine learning unit 300.

Figure 4:
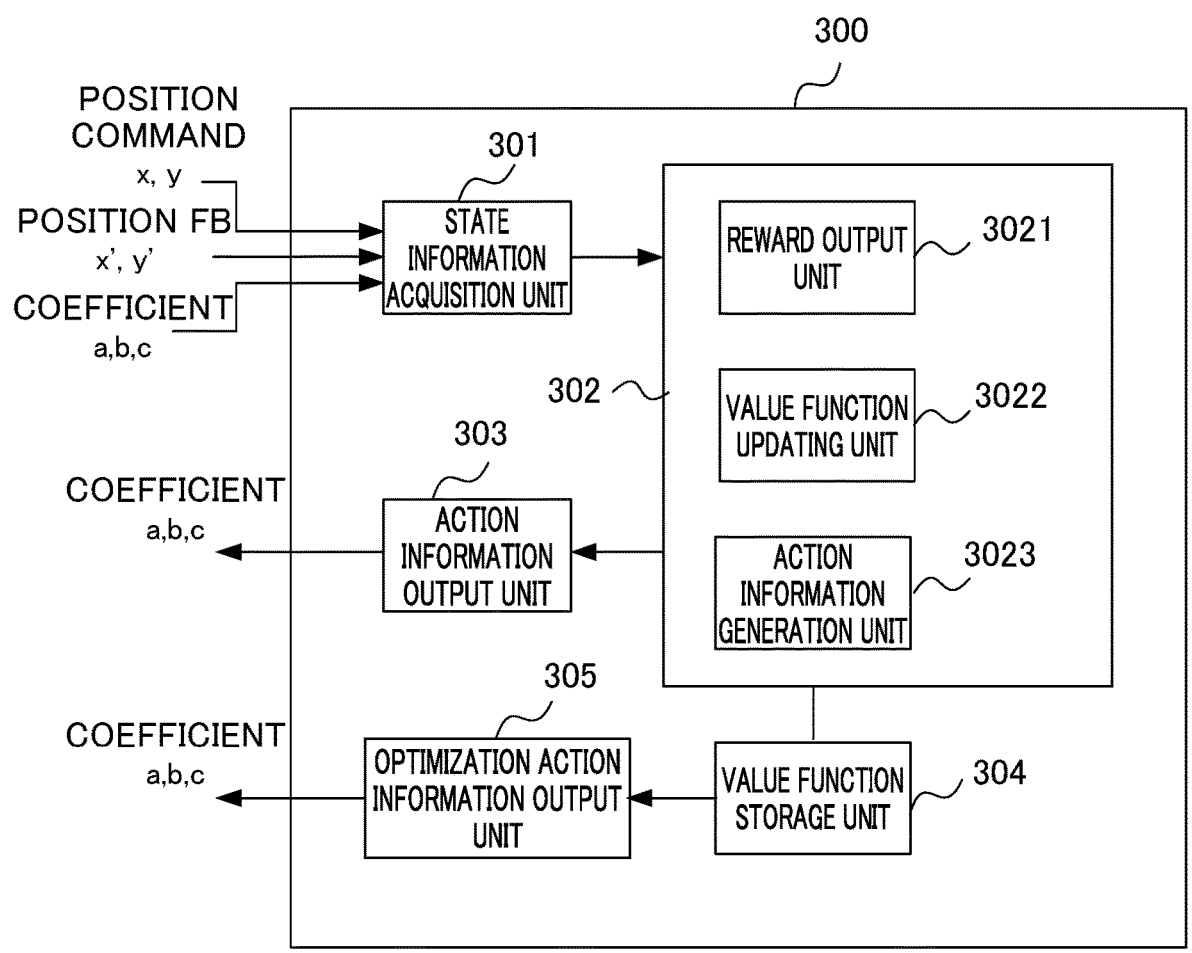
FIG. 4 is a block diagram illustrating a machine learning unit according to the first embodiment of the present disclosure.

FIG. 4 is a block diagram illustrating the machine learning unit 300 according to the first embodiment of the present invention. As illustrated in FIG. 4, in order to perform the reinforcement learning described above, the machine learning unit 300 includes a state information acquisition unit 301, a learning unit 302, an action information output unit 303, a value function storage unit 304, and an optimization action information output unit 305. The learning unit 302 includes a reward output unit 3021, a value function updating unit 3022, and an action information generation unit 3023.

The state information acquisition unit 301 acquires the state S including the set of the position commands x and the set of the position feedback information x' (serving as the second servo control information) of the servo control unit 200 obtained by executing the machining program during learning and the set of the position commands y and the set of the position feedback information y' of the servo control unit 100 obtained by executing the machining program during learning on the basis of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113. The state information S corresponds to the environmental state S in the Q-learning. It is noted that, in FIG. 4, the coefficients $a_1$ to $a_6$, the coefficients $b_1$ to $b_6$, and the coefficients $c_1$ to $c_6$ are indicated simply as coefficients a, b, c. The state information acquisition unit 301 outputs the acquired state information S to the learning unit 302.

It is noted that a user shall generate in advance the values at the initial time when the Q-learning starts, of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113. In the present embodiment, the machine learning unit 300 adjusts the initial setting values generated by a user of the coefficients $a_1$ to $a_6$, the coefficients $b_1$ to $b_6$, and the coefficients $c_1$ to $c_6$ to optimal values by the reinforcement learning. It is noted that when a machine tool is adjusted by an operator in advance, the adjusted values of the coefficients $a_1$ to $a_6$, the coefficients $b_1$ to $b_6$, and the coefficients $c_1$ to $c_6$ may be subjected to machine learning as the initial values.

The learning unit 302 is configured to learn a value Q(S,A) when a certain action A is selected under a certain environmental state S.

The reward output unit 3021 is configured to calculate a reward when the action A is selected under a certain state S. A state S' denotes the state changed from the state S by the action A (correction of the coefficients $a_1$ to $a_6$, the coefficients $b_1$ to $b_6$, and the coefficients $c_1$ to $c_6$). The reward output unit 3021 obtains a difference between the position command y and the position feedback information y' in the state S and the state S'. The position error obtained by the reward output unit 3021 from the difference between the position command y and the position feedback information y' corresponds to a second position error. The set of differences (y–y') is called a position error set. The position error set in the state S is denoted by PD(S), and the position error set in the state S' is denoted by PD(S').

The following functions are available as an evaluation function f:
a function that calculates an integrated value of absolute values of position errors,
$\int |e| dt$;
a function that calculates an integrated value by weighting absolute values of position errors with time,
$\int t|e| dt$;
a function that calculates an integrated value of 2n-th power (n is a natural number) of absolute values of position errors,
$\int e^{2n} dt$ (n is a natural number);
a function that calculates the maximum value of absolute values of position errors,
$\text{Max}\{|e|\}$; and the like,
wherein the position error (y–y') of the servo control unit 100 for the axis receiving interference is indicated with a position error e. The value of the evaluation function f obtained by use of the position error set PD(S) is denoted by an evaluation function value f(PD(S)), and the value of the evaluation function f obtained by use of the position error set PD(S') is denoted by an evaluation function value f(PD(S')). Even when the position command y input into the servo control unit 100 is a command to perform reciprocative movement along the Z axis and is not a command to stop movement along the Z axis, the above-described evaluation function f is available as an evaluation function.

In this case, the reward output unit 3021 sets the value of a reward to a negative value when the evaluation function value f(PD(S')) of the servo control unit 100 operated on the basis of the position error compensation unit 111, the velocity command compensation unit 112, and the torque command compensation unit 113 after correction related to the state information S' corrected by action information A is larger than the evaluation function value f(PD(S)) of the servo control unit 100 operated on the basis of the position error compensation unit 111, the velocity command compensation unit 112, and the torque command compensation unit 113 before correction related to the state information S before being corrected by the action information A.

On the other hand, the reward output unit 3021 sets the value of a reward to a positive value when the evaluation function value f(PD(S')) is smaller than the evaluation function value f(PD(S)). It is noted that the reward output unit 3021 sets the value of a reward to zero when the evaluation function value f(PD(S')) is equal to the evaluation function value f(PD(S)).

The reward output unit 3021 may set the value to a larger absolute value of negative value according to proportion when the evaluation function value f(PD(S')) in the state S' after execution of the action A is larger than the evaluation function value f(PD(S)) in the previous state S. In other words, a larger absolute value of negative value may be set according to the degree of increase in the value f(PD(S)). In contrast, the reward output unit 3021 may set the value to a larger positive value according to proportion when the evaluation function value f(PD(S')) in the state S' after execution of the action A is smaller than the evaluation function value f(PD(S)) in the previous state S. In other words, a larger positive value may be set according to the degree of decrease in the value f(PD(S')).

The value function updating unit 3022 updates the value function Q stored in the value function storage unit 304 by performing the Q-learning on the basis of the state S, the action A, the state S' obtained when the action A is applied to the state S, and the value of the reward calculated in the above-described manner. The value function Q may be updated by online learning, batch learning, or mini-batch learning.

Online learning is a learning method of applying a certain action A to a present state S and updating the value function Q immediately whenever the present state S transitions to a new state S'. Batch learning is a learning method of applying a certain action A to a present state S and repeatedly attaining transition from the state S to a new state S', collecting learning data, and updating the value function Q using all the collected learning data. Mini-batch learning is a learning method which is intermediate between online learning and batch learning and involves updating the value function Q whenever a certain amount of learning data is collected.

The action information generation unit 3023 selects the action A in the process of the Q-learning with respect to the present state S. The action information generation unit 3023 generates action information A and outputs the generated action information A to the action information output unit 303 in order to perform an operation (corresponding to the action A in the Q-learning) of correcting the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113 in the process of the Q-learning. More specifically, the action information generation unit 3023 incrementally adds or subtracts the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113 included in the action A, with respect to the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113 included in the state S, for example.

When the coefficients $a_1$ to $a_6$, the coefficients $b_1$ to $b_6$, and the coefficients $c_1$ to $c_6$ are increased or decreased, and thereby the state S transitions to the state S' and a plus reward (a positive reward) is offered in return, the action information generation unit 3023 may take a policy of selecting a next action A' which leads to the value of the evaluation function f becoming further decreased, such as by incremental addition or subtraction with respect to the coefficients $a_1$ to $a_6$, the coefficients $b_1$ to $b_6$, and the coefficients $c_1$ to $c_6$, as with the previous action.

In contrast, when a minus reward (a negative reward) is offered in return, the action information generation unit 3023 may take a policy of selecting a next action A' which leads to the value of the evaluation function becoming smaller than the previous value, such as by, contrarily to the previous action, incremental subtraction or addition with respect to the coefficients $a_1$ to $a_6$, the coefficients $b_1$ to $b_6$, and the coefficients $c_1$ to $c_6$.

The action information generation unit 3023 may take a policy of selecting the action A' according to a known method such as a greedy method of selecting an action A' having the highest value Q(S,A) among the values of presently estimated actions A or an s-greedy method of randomly selecting an action A' with a certain small probability s and selecting an action A' having the highest value Q(S,A) in other cases.

The action information output unit 303 is configured to transmit the action information A output by the learning unit 302 to the position error compensation unit 111, the velocity command compensation unit 112, and the torque command compensation unit 113. As described above, the position error compensation unit 111, the velocity command compensation unit 112, and the torque command compensation unit 113 finely correct the present state S, that is, the currently set coefficients of the coefficients $a_1$ to $a_6$, the coefficients $b_1$ to $b_6$, and the coefficients $c_1$ to $c_6$ on the basis of the action information, whereby the present state S transitions to the next state S' (that is, the coefficients after correction of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113).

The value function storage unit 304 is a storage device for storing the value function Q. The value function Q may be stored as a table (hereinafter referred to as an action value table) for each state S and each action A, for example. The value function Q stored in the value function storage unit 304 is updated by the value function updating unit 3022. The value function Q stored in the value function storage unit 304 may be shared with another machine learning unit 300. When the value function Q is shared by a plurality of machine learning units 300, reinforcement learning can be performed in a distributed manner by the respective machine learning units 300, and thus it is possible to improve the efficiency in the reinforcement learning.

The optimization action information output unit 305 generates the action information A (hereinafter referred to as "optimization action information") which causes the position error compensation unit 111, the velocity command compensation unit 112, and the torque command compensation unit 113 to perform the operation of maximizing the value Q(S,A) on the basis of the value function Q updated by the value function updating unit 3022 performing the Q-learning. More specifically, the optimization action information output unit 305 acquires the value function Q stored in the value function storage unit 304. As described above, the value function Q is updated by the value function updating unit 3022 performing the Q-learning. The optimization action information output unit 305 generates the action information on the basis of the value function Q and outputs the generated action information to the position error compensation unit 111, the velocity command compensation unit 112, and the torque command compensation unit 113. The optimization action information includes information for correcting the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113, as with the action information output by the action information output unit 303 in the process of the Q-learning.

The position error compensation unit 111, the velocity command compensation unit 112, and the torque command compensation unit 113 correct the coefficients $a_1$ to $a_6$, the coefficients $b_1$ to $b_6$, and the coefficients $c_1$ to $c_6$, respectively, on the basis of the action information. With the above-described operations, the machine learning unit 300 can optimize the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113, thereby enabling to compensate for interference between axes and improve command followability.

Figure 5:
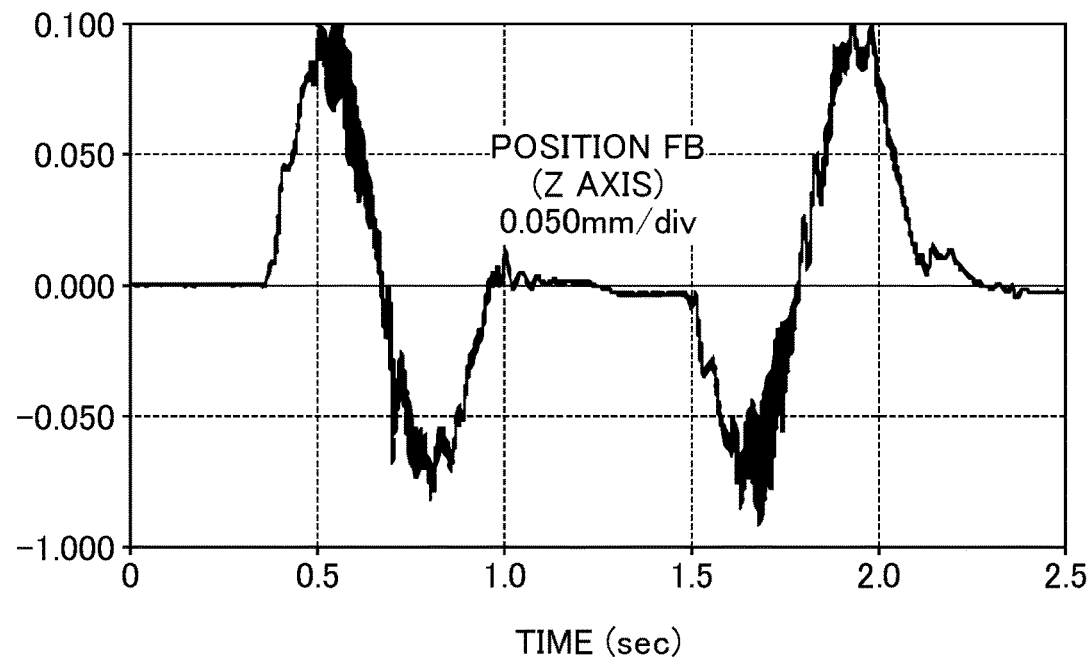
FIG. 5 is a characteristic diagram indicating variations in position feedback information before adjustment of coefficients by machine learning when driving the 4-axis machine tool shown in FIG. 2.
Figure 6:
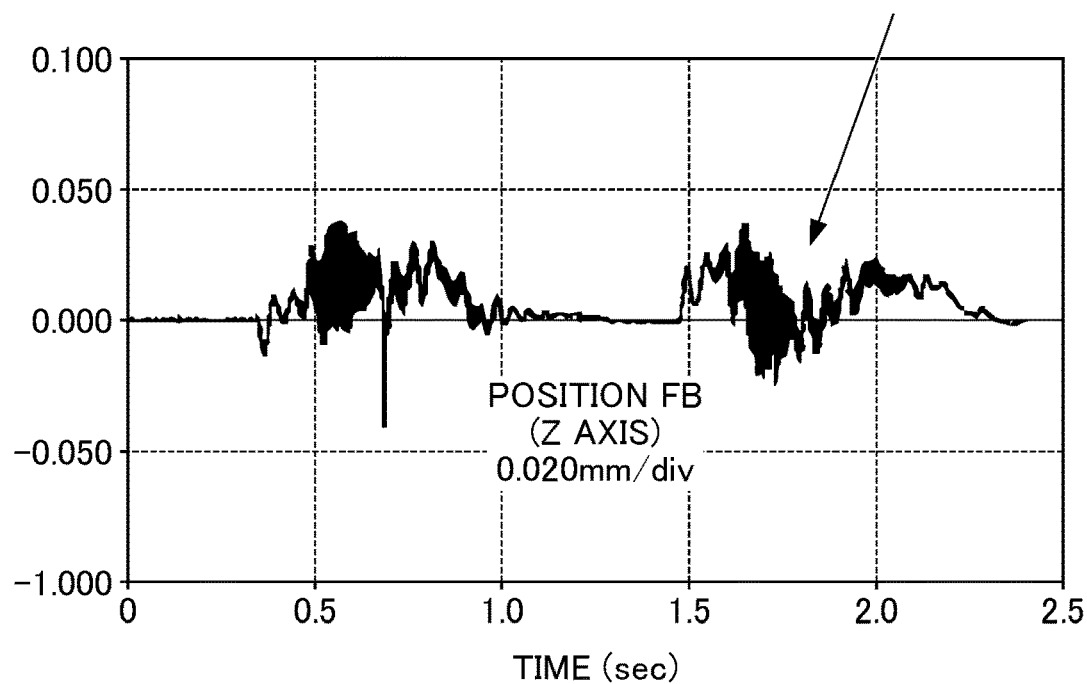
FIG. 6 is a characteristic diagram indicating the variations in the position feedback information after the adjustment of the coefficients by the machine learning when driving the 4-axis machine tool shown in FIG. 2.

FIG. 5 is a characteristic diagram indicating variations in the position feedback (position FB) information before the adjustment of the coefficients (parameters) by machine learning when driving the 4-axis machine tool 20A shown in FIG. 2. FIG. 6 is a characteristic diagram indicating variations in the position feedback (position FB) information after adjustment of the coefficients (parameters) by machine learning when driving the 4-axis machine tool 20A shown in FIG. 2. Each of FIG. 5 and FIG. 6 indicates the variations in the position feedback information of the servo control unit 100 during when the servo control units 100 and 200 are driven to perform the reciprocative movement along the Y axis and stop the movement along the Z axis. As shown in the characteristic diagram of FIG. 6, the position variations are improved by the adjustment of the coefficients (parameters) by the machine learning compared to the position variations in the characteristic diagram shown in FIG. 5, and command followability is improved.

Figure 7:
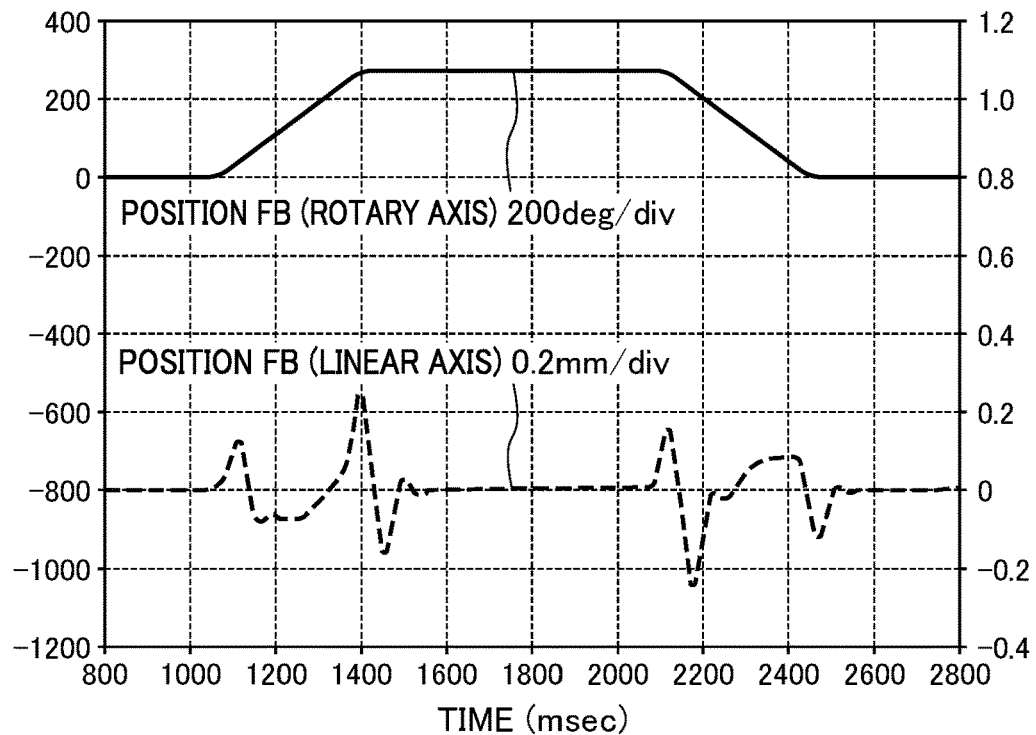
FIG. 7 is a characteristic diagram indicating variations in position feedback information of a rotary axis and an X axis before adjustment of coefficients by machine learning when driving the 5-axis machine tool shown in FIG. 3.
Figure 8:
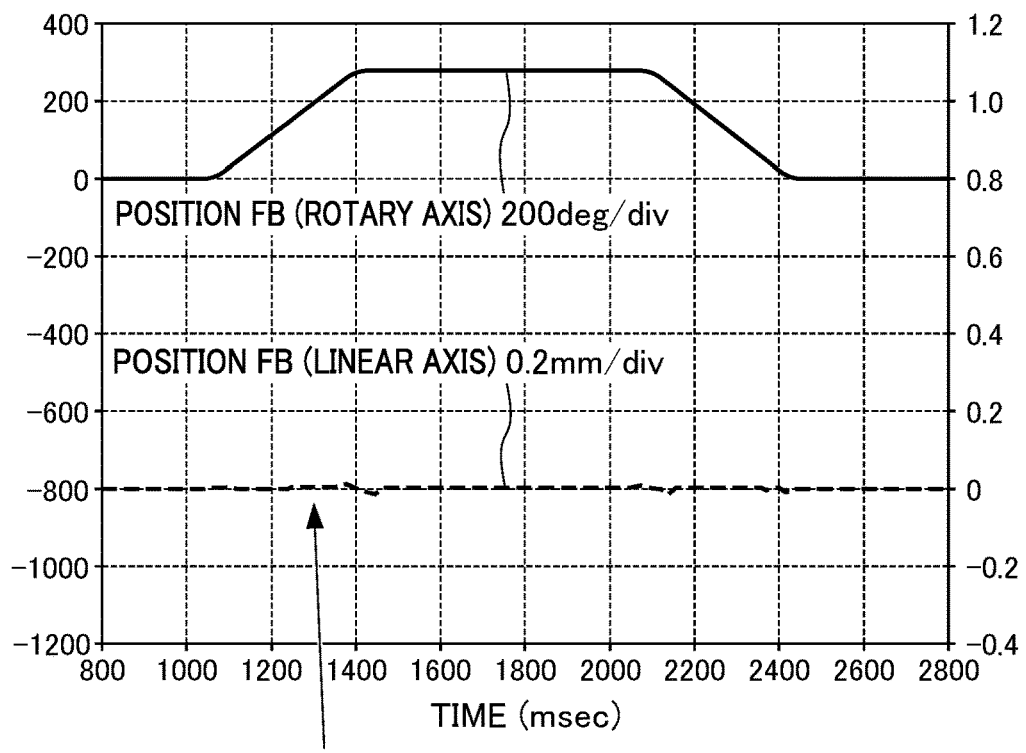
FIG. 8 is a characteristic diagram indicating the variations in the position feedback information of the rotary axis and the X axis after the adjustment of the coefficients by the machine learning when driving the 5-axis machine tool shown in FIG. 3.

FIG. 7 is a characteristic diagram indicating variations in the position feedback (position FB) information of the rotary axis and the X axis before the adjustment of the coefficients (parameters) when driving the 5-axis machine tool 20B shown in FIG. 3. FIG. 8 is a characteristic diagram indicating the variations in the position feedback (position FB) information of the rotary axis and the X axis after the adjustment of the coefficients (parameters) when driving the 5-axis machine tool 20B shown in FIG. 3. In each of FIG. 7 and FIG. 8, the right vertical axis represents a value of the position feedback (position FB) information of the X axis serving as a linear axis, and the left vertical axis represents a value of the position feedback (position FB) information of the rotary axis. Each of FIG. 7 and FIG. 8 indicates the variations in the position feedback information of the servo control unit 100 during when the servo control units 100 and 200 are driven to perform rotation about the rotary axis and stop the movement along the X axis. As shown in the characteristic diagram of FIG. 8, the position variations along the X axis are improved by the adjustment of the coefficients (parameters) by the machine learning compared to the position variations in the characteristic diagram shown in FIG. 7, and command followability is improved.

As described above, the usage of the machine learning unit 300 according to the present embodiment simplifies the adjustment of the coefficients of the position error compensation unit 111, the velocity command compensation unit 112, and the torque command compensation unit 113.

Hereinabove, the functional blocks included in the servo control device 10 have been described. In order to realize these functional blocks, the servo control device 10 includes an arithmetic processing unit such as a central processing unit (CPU). The servo control device 10 further includes an auxiliary storage device such as a hard disk drive (HDD) for storing various types of control programs such as application software or an operating system (OS) and a main storage device such as a random access memory (RAN) for storing data temporarily required when the arithmetic processing unit executes a program.

In the control device 10, the arithmetic processing unit reads the application software or the OS from the auxiliary storage device and deploys the read application software or OS in the main storage device to perform arithmetic processing based on the read application software or OS. Various types of hardware disposed in respective devices are controlled on the basis of the arithmetic result. In this way, the functional blocks of the present embodiment are realized. That is, the present embodiment can be realized by the cooperation of hardware and software.

Since the machine learning unit 300 involves large amount computation associated with the machine learning, graphics processing units (GPUs) may be mounted on a personal computer and be used for arithmetic processing associated with the machine learning using a technique called general-purpose computing on graphics processing units (GPGPUs). In this way, high-speed processing can be performed. Furthermore, in order for the machine learning unit 130 to perform higher-speed processing, a computer cluster may be built using a plurality of computers equipped with such GPUs, and the plurality of computers included in the computer cluster may perform parallel processing.

Figure 9:
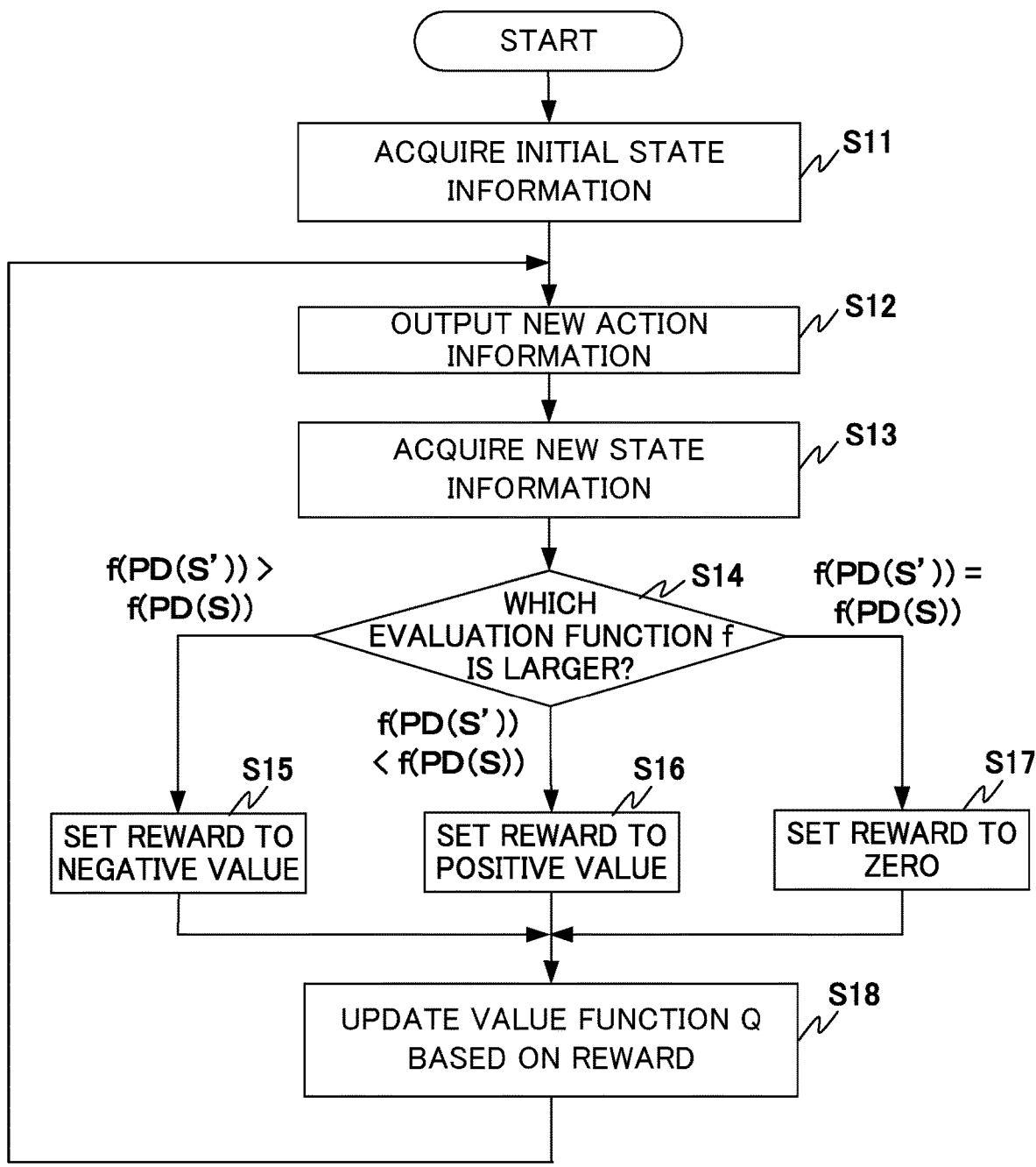
FIG. 9 is a flowchart for describing operations of the machine learning unit according to the first embodiment of the present disclosure.

The following description with reference to the flowchart shown in FIG. 9 is about the operations of the machine learning unit 300 during the Q-learning according to the present embodiment.

In step S11, the state information acquisition unit 301 acquires an initial state information $S_0$ from the servo control units 100 and 200. The acquired state information is output to the value function updating unit 3022 and the action information generation unit 3023. As described above, the state information S corresponds to the state in the Q-learning.

The set of the position commands x and the set of the position commands y in the state $S_0$ at the initial time when the Q-learning starts are obtained from an upper control device, or an external input device, or the servo control unit 200 and the servo control unit 100. The set of the position feedback information x' and the set of the position feedback information y' in the state $S_0$ are obtained by making the servo control unit 100 and the servo control unit 200 operate by the machining program during learning. The set of the position commands x input into the servo control unit 200 corresponds to the commands to perform reciprocative movement along the Y axis. The set of the position commands y input into the servo control unit 100 corresponds to the commands to stop the movement along the Z axis. The position command x is input into the position feedforward unit 209, the subtractor 201, the position error compensation unit 111, the velocity command compensation unit 112, the torque command compensation unit 113, and the machine learning unit 300. The position command y is input into the subtractor 101 and the machine learning unit 300. A user generates in advance the initial values of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113, and the initial values of the coefficients $a_1$ to $a_6$, the coefficients $b_1$ to $b_6$, and the coefficients $c_1$ to $c_6$ are transmitted to the machine learning unit 300. For example, as the initial values, the coefficients $a_1$ to $a_6$ are all set to zero, the coefficients $b_1$ to $b_6$ are all set to zero, and the coefficients $c_1$ to $c_6$ are all set to zero. It is noted that the machine learning unit 300 may extract the set of the position commands x, the set of the position feedback information x', the set of the position commands y, and the set of the position feedback information y' in the state $S_0$ described above.

In step S12, the action information generation unit 3023 generates new action information A and outputs the generated new action information A to the position error compensation unit 111, the velocity command compensation unit 112, and the torque command compensation unit 113 via the action information output unit 303. The action information generation unit 3023 outputs the new action information A on the basis of the above-described policy. It is noted that the servo control unit 100 having received the action information A drives a machine tool including the servo motor 108 according to the state S' including the corrected coefficients of the coefficients $a_1$ to $a_6$, the coefficients $b_1$ to $b_6$, and the coefficients $c_1$ to $c_6$, respectively, of the position error compensation unit 111, the velocity command compensation unit 112, and the torque command compensation unit 113 related to the present state S on the basis of the received action information. As described above, the action information corresponds to the action A in the Q-learning. The present state S corresponds to the state $S_0$ at the initial time when the Q-learning starts.

In step S13, the state information acquisition unit 301 acquires the set of the position commands x and the set of the position feedback information x', the set of the position commands y and the set of the position feedback information y', the coefficients $a_1$ to $a_6$, the coefficients $b_1$ to $b_6$, and the coefficients $c_1$ to $c_6$ in the new state S'. In this way, the state information acquisition unit 301 acquires the set of the position commands x and the set of the position feedback information x', and the set of the position commands y and the set of the position feedback information y' in the state S' with the coefficients $a_1$ to $a_6$, the coefficients $b_1$ to $b_6$, and the coefficients $c_1$ to $c_6$. The acquired state information is output to the reward output unit 3021.

In step S14, the reward output unit 3021 determines a magnitude relation between the evaluation function value f(PD(S')) in the state S' and the evaluation function value f(PD(S)) in the state S. In the case of f(PD(S'))>f(PD(S)), then in step S15 the reward output unit 3021 sets the reward to a negative value. In the case of f(PD(S'))<f(PD(S)), then in step S16 the reward output unit 3021 sets the reward to a positive value. In the case of f(PD(S'))=f(PD(S)), then in step S17 the reward output unit 3021 sets the reward to zero. It is noted that the reward output unit 3021 may apply weighting to negative and positive reward values. It is noted that the state S at the initial time when the Q-learning starts corresponds to the state $S_0$.

When any one of steps S15, S16, and S17 ends, then in step S18 the value function updating unit 3022 updates the value function Q stored in the value function storage unit 304 on the basis of a value of the reward calculated in any one of those steps. After that, the flow returns to step S12 again, and the above-described processing is repeated, whereby the value function Q converges on an appropriate value. It is noted that the processing may end on a condition that the above-described processing is repeated a predetermined number of times or for a predetermined period of time. It is noted that although online updating is exemplified as the updating in step S18, batch updating or mini-batch updating may be performed instead of the online updating.

Figure 10:
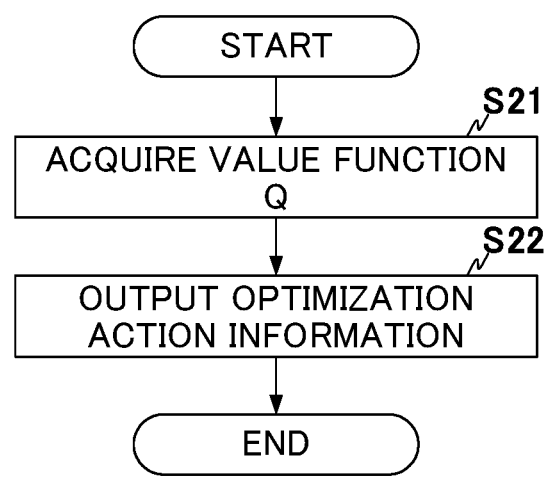
FIG. 10 is a flowchart for describing operations of an optimization action information output unit of the machine learning unit according to the first embodiment of the present disclosure.

In the present embodiment, the operations described with reference to FIG. 9 by use of the machine learning unit 300 produce the effects of enabling to obtain an appropriate value function for adjustment of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113, and thereby to simplify optimization of the coefficients $a_1$ to $a_6$, the coefficients $b_1$ to $b_6$, and the coefficients $c_1$ to $c_6$. The following description with reference to the flowchart shown in FIG. 10 is about the operations by the optimization action information output unit 305 to generate the optimization action information. First, in step S21, the optimization action information output unit 305 acquires the value function Q stored in the value function storage unit 304. As described above, the value function Q is updated by the value function updating unit 3022 performing the Q-learning.

In step S22, the optimization action information output unit 305 generates the optimization action information on the basis of the value function Q and outputs the generated optimization action information to the servo control unit 100.

In the present embodiment, the operations described with reference to FIG. 10 enable to generate the optimization action information on the basis of the value function Q obtained by the machine learning unit 300 performing the learning, thereby simplifying the adjustment based on the optimization action information of the coefficients set presently of the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113, resulting in enabling to improve the quality of a machining surface of a workpiece.

The above-described components included in the servo control unit and the machine learning unit may be realized by hardware, software, or a combination thereof. The servo control method performed by the cooperation of the components included in the servo control device described above may also be realized by hardware, software, or a combination thereof. Here, being realized by software means being realized when a computer reads and executes a program.

Programs can be stored in various types of non-transitory computer-readable media and be supplied to a computer. The non-transitory computer-readable media include various types of tangible storage media. Examples of the non-transitory computer-readable media include a magnetic recording medium (for example, a hard disk drive), a magneto-optical recording medium (for example, a magneto-optical disk), a CD-ROM (read only memory), a CD-R, a CD-R/W, and a semiconductor memory (for example, a mask ROM, a PROM (programmable ROM), an EPROM (erasable PROM), a flash ROM, and a RAM (random access memory)).

The above-described embodiment is a preferred embodiment of the present invention. However, the scope of the present invention is not limited to the present embodiment, and the present invention can be embodied in various modifications without departing from the spirit of the present invention.

For example, in the embodiment described above, the machine learning unit 300 obtains a difference between the position command y and the position feedback information y' of the servo control unit 100 for the axis receiving interference in order to obtain a value of the evaluation function f. Alternatively, the machine learning unit 300 may obtain a value of the evaluation function f by use of a position error (y−y') output by the subtractor 101 of the servo control unit 100. The position error (y−y') output by the subtractor 101 of the servo control unit 100 corresponds to a first position error.

In the embodiment described above, the machine learning unit 300 simultaneously learns the coefficients $a_1$ to $a_6$ in Expression 1 of the position error compensation unit 111, the coefficients $b_1$ to $b_6$ in Expression 2 of the velocity command compensation unit 112, and the coefficients $c_1$ to $c_6$ in Expression 3 of the torque command compensation unit 113. Alternatively, the machine learning unit 300 may first learn and optimize any coefficients among the coefficients $a_1$ to $a_6$, the coefficients $b_1$ to $b_6$, and the coefficients $c_1$ to $c_6$, and may thereafter sequentially learn and optimize the other coefficients.

In the embodiment described above, the reward output unit 3021 of the machine learning unit 300 uses a position error as the evaluation function. Alternatively, the reward output unit 3021 may use a velocity error or an acceleration error. A velocity error is obtained by differentiating a position error with respect to time, and an acceleration error is obtained by differentiating a velocity error with respect to time. As the velocity error, a difference between the velocity command output by the adder 104 and the velocity feedback information may be used, or the output by the subtractor 101 may be used.

Second Embodiment

Figure 11:
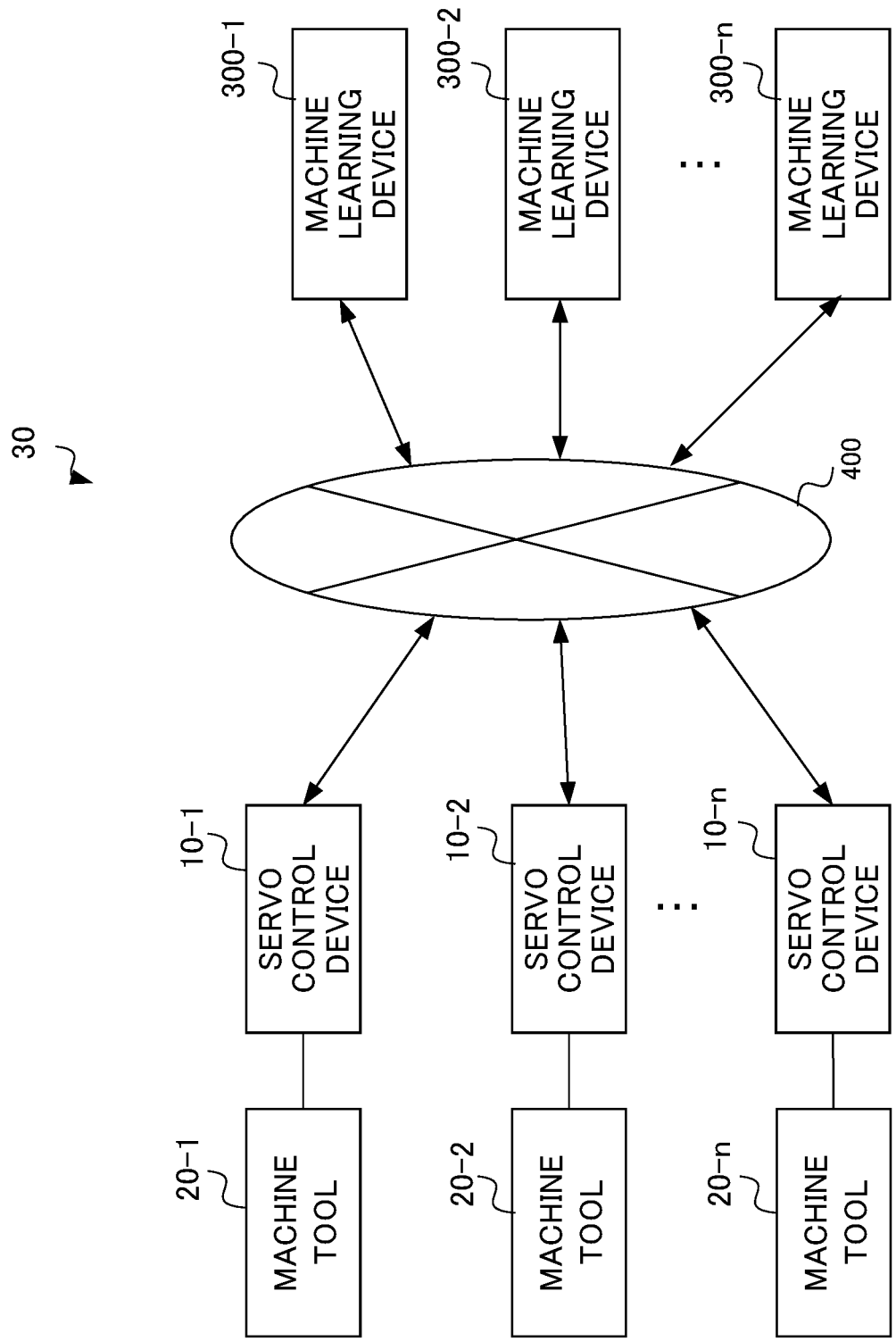
FIG. 11 is a block diagram illustrating one configuration example of a servo control system including servo control devices and machine learning devices.

In the description of the first embodiment, the machine learning unit is disposed as a part of the servo control device. In the present embodiment, a servo control system is configured with a machine learning unit disposed outside a servo control device. Hereinafter, the machine learning unit is disposed separately from the servo control device and is thus called a machine learning device. FIG. 11 is a block diagram illustrating one configuration example of the servo control system including the servo control devices and the machine learning devices. A servo control system 30 shown in FIG. 11 includes n (n is a natural number of 2 or greater) servo control devices 10-1 to 10-n, n machine learning devices 300-1 to 300-n, and a network 400 connecting the n servo control devices 10-1 to 10-n and the n machine learning devices 300-1 to 300-n. The n (n is a natural number of 2 or greater) servo control devices 10-1 to 10-n are connected to n machine tools 20-1 to 20-n, respectively. The servo control devices 10-1 to 10-n in the present embodiment respectively have the same configuration as the servo control device 10 shown in FIG. 1, except that none of the servo control devices 10-1 to 10-n include any machine learning unit. The machine learning devices 300-1 to 300-n respectively have the same configuration as the machine learning unit 300 shown in FIG. 5.

The servo control device 10-1 and the machine learning device 300-1 are communicably connected as a one-to-one pair. The motor control devices 10-2 to 10-n and the machine learning devices 300-2 to 300-n are connected as with the connection between the servo control device 10-1 and the machine learning device 300-1. In FIG. 11, the servo control devices 10-1 to 10-n and the machine learning devices 300-1 to 300-n are connected in n one-to-one pairs via the network 400. Alternatively, the servo control devices 10-1 to 10-n and the machine learning devices 300-1 to 300-n may be connected in n pairs in such a manner that a servo control device and a machine learning device in each pair are connected directly via a connection interface. For example, a plurality of the n pairs of the servo control devices 10-1 to 10-n and the machine learning devices 300-1 to 300-n may be disposed in the same plant or may be disposed in different plants.

It is noted that the network 400 is, for example, a local area network (LAN) constructed in a plant, the Internet, a public telephone network, or a combination thereof. The present disclosure is not particularly limited to a specific communication scheme of the network 400, whether the network uses a cable connection or a wireless connection, or the like.

<Freedom in System Configuration>

In the embodiments described above, the servo control devices 10-1 to 10-n and the machine learning devices 300-1 to 300-n are communicably connected as one-to-one pairs. Alternatively, for example, one machine learning device may be communicably connected to a plurality of motor control devices and a plurality of acceleration sensors via the network 400, so that the machine learning may be performed with respect to the respective motor control devices and the respective machine tools. In this case, a distributed processing system may be adopted, in which respective functions in one machine learning device are distributed to a plurality of servers as appropriate. Alternatively, the functions of one machine learning device may be realized by utilizing a virtual server function or the like in the cloud.

When n servo control devices 10-1 to 10-n of the same type name, the same specification, or the same series respectively correspond to n machine learning devices 300-1 to 300-n, the machine learning devices 300-1 to 300-n may be configured to share the learning results of the machine learning devices 300-1 to 300-n. By doing so, a more optimal model can be constructed.

The machine learning device, the control system, and the machine learning method according to the present disclosure can be realized in various types of embodiments having the following configurations, and including the embodiments described above.

(1) In one aspect of the present disclosure, a machine learning device (for example, a machine learning unit 300, machine learning devices 300-1 to 300-n) is configured to perform machine learning with respect to a plurality of servo control units (for example, servo control units 100, 200) configured to control a plurality of motors configured to drive a machine having a plurality of axes, with one axis among the plurality of axes receiving interference generated by movement along at least one of the other axes. A first servo control unit (for example, a servo control unit 100) related to the one axis receiving the interference among the plurality of servo control units includes a compensation unit (for example, a position error compensation unit 111, a velocity command compensation unit 112, a torque command compensation unit 113) configured to obtain a compensation value for compensating for at least one of a position error, a velocity command, and a torque command of the first servo control unit on the basis of a function including at least one of a variable related to a position command and a variable related to position feedback information of a second servo control unit (for example, a servo control unit 200) related to the axis generating the interference. The machine learning device includes a state information acquisition unit (for example, a state information acquisition unit 301) configured to acquire state information including first servo control information of the first servo control unit, second servo control information of the second servo control unit, and a coefficient of the function, an action information output unit (for example, an action information output unit 303) configured to output action information including adjustment information of the coefficient included in the state information to the compensation unit, a reward output unit (for example, a reward output unit 3021) configured to output a reward value for reinforcement learning using an evaluation function serving as a function of the first servo control information, and a value function updating unit (for example, a value function updating unit 3022) configured to update a value function on the basis of the reward value output by the reward output unit, the state information, and the action information. The machine learning device is capable of optimizing the coefficient of the compensation unit of the servo control unit configured to compensate for interference between axes, thereby preventing the servo control unit from performing complicated adjustments, resulting in enabling to improve the command followability of the servo control unit.

(2) In the machine learning device according to (1) above, the first servo control information includes a position command and position feedback information of the first servo control unit, or a first position error of the first servo control unit, and
the evaluation function outputs the reward value on the basis of a value including a second position error obtained from the position command and the position feedback information of the first servo control unit or the first position error, an absolute value of the first or second position error, or a second power of the absolute value.

(3) In the machine learning device according to (1) or (2) above, the variable related to the position command of the second servo control unit is at least one of the position command, a differentiated value of the position command, and a double-differentiated value of the position command of the second servo control unit, and the variable related to the position feedback information of the second servo control unit is at least one of the position feedback information, a differentiated value of the position feedback information and a double-differentiated value of the position feedback information of the second servo control unit.

(4) In the machine learning device according to any one of (1) to (3) above, a machining program during learning for controlling the first and second servo control units makes the first and second servo control units perform movement along the axis generating the interference and stop movement along the axis receiving the interference during the machine learning.

(5) The machine learning device according to any one of (1) to (4) above includes an optimization action information output unit configured to output the adjustment information of the coefficient of the compensation unit on the basis of the value function updated by the value function updating unit.

(6) In another aspect of the present disclosure, a servo control device (for example, a servo control device 10) includes the machine learning device (for example, the machine learning unit 300) according to any one of (1) to (5) above, and
a plurality of servo control units (for example, servo control units 100, 200) configured to control a plurality of motors configured to drive a machine having a plurality of axes, with one axis among the plurality of axes receiving interference generated by movement along at least one of the other axes. A first servo control unit (for example, a servo control unit 100) related to the one axis receiving the interference among the plurality of servo control units includes a compensation unit (for example, a position error compensation unit 111, a velocity command compensation unit 112, a torque command compensation unit 113) configured to obtain a compensation value for compensating for at least one of a position error, a velocity command, and a torque command of the first servo control unit on the basis of a function including at least one of a variable related to a position command and a variable related to position feedback information of a second servo control unit (for example, a servo control unit 200) related to the axis generating the interference. The machine learning device outputs action information including adjustment information of the coefficient to the compensation unit. The servo control device is capable of compensating for interference between axes while avoiding complicated adjustments, thereby providing higher command followability.

(7) In another aspect of the present disclosure, a servo control system (for example, a servo control system 30) includes the machine learning device according to any one of (1) to (5) above, and
a servo control device (for example, servo control devices 10-1 to 10-$n$) including a plurality of servo control units (for example, servo control units 100, 200) configured to control a plurality of motors configured to drive a machine having a plurality of axes, with one axis among the plurality of axes receiving interference generated by movement along at least one of the other axes. A first servo control unit (for example, a servo control unit 100) related to the one axis receiving the interference among the plurality of servo control units includes a compensation unit (for example, a position error compensation unit 111, a velocity command compensation unit 112, a torque command compensation unit 113) configured to obtain a compensation value for compensating for at least one of a position error, a velocity command, and a torque command of the first servo control unit on the basis of a function including at least one of a variable related to a position command and a variable related to position feedback information of a second servo control unit (for example, a servo control unit 200) related to the axis generating the interference. The machine learning device outputs action information including adjustment information of the coefficient to the compensation unit. The servo control system allows the servo control unit to compensate for interference between axes while avoiding complicated adjustments, thereby providing excellent command followability.

(8) In another aspect of the present disclosure, a machine learning method for a machine learning device (for example, a machine learning unit 300, machine learning devices 300-1 to 300-$n$) configured to perform machine learning with respect to a plurality of servo control units (for example, servo control units 100, 200) configured to control a plurality of motors configured to drive a machine having a plurality of axes, with one axis among the plurality of axes receiving interference generated by movement along at least one of the other axes. A first servo control unit (for example, a servo control unit 100) related to the one axis receiving the interference among the plurality of servo control units includes a compensation unit (for example, a position error compensation unit 111, a velocity command compensation unit 112, a torque command compensation unit 113) configured to obtain a compensation value for compensating for at least one of a position error, a velocity command, and a torque command of the first servo control unit on the basis of a function including at least one of a variable related to a position command and a variable related to position feedback information of a second servo control unit (for example, a servo control unit 200) related to the axis generating the interference. The machine learning method includes the steps of acquiring state information including first servo control information of the first servo control unit, second servo control information of the second servo control unit, and a coefficient of the function,
outputting action information including adjustment information of the coefficient included in the state information to the compensation unit,
outputting a reward value for reinforcement learning using an evaluation function serving as a function of the first servo control information, and
updating a value function on the basis of the reward value, the state information, and the action information. The machine learning method allows to optimize the coefficient of the compensation unit of the servo control unit configured to compensate for interference between axes, thereby preventing the servo control unit from performing complicated adjustments, resulting in enabling to improve the command followability of the servo control unit.

(9) The machine learning device according to (8) above outputs adjustment information of the coefficient of the compensation unit serving as optimization action information on the basis of the updated value function.

EXPLANATION OF REFERENCE NUMERALS 10, 10-1 to 10-$n$ Servo control device
20, 20-1 to 20-$n$ Machine tool
100, 200 Servo control unit
101, 201 Subtractor
102 Adder
103, 202 Position control unit
104, 203 Adder
105, 204 Subtractor
106, 205 Velocity control unit
107 Adder
108, 206 Servo motor
109, 207 Rotary encoder
110, 208 Integrator
111 Position error compensation unit
112 Velocity command compensation unit
113 Torque command compensation unit
209 Position feedforward unit
300 Machine learning unit
300-1 to 300-$n$ Machine learning device
400 Network

What is claimed is:

1. A machine learning device configured to perform machine learning with respect to a plurality of servo control units configured to control a plurality of motors, the motors configured to drive a machine having a plurality of axes, with one axis among the plurality of axes receiving interference generated by movement along at least one of the other axes,
a first servo control unit related to the one axis receiving the interference among the plurality of servo control units, the first servo control unit comprising:
compensation units including a position error compensation unit configured to obtain a compensation value for compensating for a position error, a velocity command compensation unit configured to obtain a compensation value for compensating for a velocity command, and a torque command compensation unit configured to obtain a value for compensating for a torque command of the first servo control unit based on one or more functions including at least one of variables related to a position command and variables related to position feedback information of a second servo control unit related to the axis generating the interference, and
the machine learning device comprising:
a state information acquisition unit configured to acquire state information including first servo control information of the first servo control unit, second servo control information of the second servo control unit, and coefficients for each of the position error compensation unit, the velocity command compensation unit, and the torque command compensation unit based on the one or more functions;
an action information output unit configured to output action information including adjustment information for adjusting of the coefficients for each of the position error compensation unit, the velocity command compensation unit, and the torque command compensation unit of the compensation units included in the state information to the compensation units;
a reward output unit configured to output a reward value each time an action is executed based on the adjusting of the coefficients for reinforcement learning using an evaluation function serving as a function of the first servo control information; and
a value function updating unit configured to update a value function related to the adjustment information of the coefficients based on the reward value output by the reward output unit, the state information, and the action information.

2. The machine learning device according to claim 1, wherein
the first servo control information includes a position command and position feedback information of the first servo control unit or a first position error of the first servo control unit, and
the evaluation function outputs the reward value based on a value including a second position error obtained from the position command and the position feedback information of the first servo control unit or the first position error, an absolute value of the first or second position error, or a second power of the absolute value.

3. The machine learning device according to claim 1, wherein
the variable related to the position command of the second servo control unit is at least one of the position command, a differentiated value of the position command, and a double-differentiated value of the position command of the second servo control unit, and
the variable related to the position feedback information of the second servo control unit is at least one of the position feedback information, a differentiated value of the position feedback information, and a double-differentiated value of the position feedback information of the second servo control unit.

4. The machine learning device according to claim 1, wherein
a machining program during learning for controlling the first and second servo control units makes the first and second servo control units perform movement along the axis generating the interference and stop movement along the axis receiving the interference during the machine learning.

5. The machine learning device according to claim 1, the machine learning device comprising:
an optimization action information output unit configured to output the adjustment information for adjusting of the coefficients included in the state information based on the value function updated by the value function updating unit, and to output the adjustment information to the compensation units.

6. A servo control device including: the machine learning device according to claim 1; and
the plurality of servo control units configured to control the plurality of motors, the motors configured to drive the machine having the plurality of axes, with the one axis among the plurality of axes receiving the interference generated by the movement along at least one of the other axes, wherein the first servo control unit related to the one axis receiving the interference among the plurality of servo control units comprises the compensation units configured to obtain the corresponding compensation value for compensating for the at least one of the position error, the velocity command, and the torque command of the first servo control unit based on the one or more functions including the at least one of the variable related to the position command and the variable related to the position feedback information of the second servo control unit related to the axis generating the interference, and wherein the machine learning device outputs the action information including the adjustment information of the coefficients to the compensation units.

7. A servo control system including:

the machine learning device according to claim 1; and a servo control device including the plurality of servo control units configured to control the plurality of motors, the motors configured to drive the machine having the plurality of axes, with the one axis among the plurality of axes receiving the interference generated by the movement along at least one of the other axes, wherein the first servo control unit related to the one axis receiving the interference among the plurality of servo control units comprises the compensation units configured to obtain the corresponding compensation value for compensating for the at least one of a position error, the velocity command, and the torque command of the first servo control unit based on the one or more functions including the at least one of the variable related to a position command and the variable related to the position feedback information of the second servo control unit related to the axis generating the interference, and wherein the machine learning device outputs the action information including the adjustment information of the coefficients to the compensation units.

8. A machine learning method for a machine learning device configured to perform machine learning with respect to a plurality of servo control units configured to control a plurality of motors, the motors configured to drive a machine having a plurality of axes, with one axis among the plurality of axes receiving interference generated by movement along at least one of the other axes, a first servo control unit related to the one axis receiving the interference among the plurality of servo control units, the first servo control unit comprising compensation units including a position error compensation unit configured to obtain a compensation value for compensating for a position error, a velocity command compensation unit configured to obtain a compensation value for compensating for a velocity command, and a torque command compensation unit configured to obtain a compensation value for compensating for a torque command of the first servo control unit based on one or more functions including at least one of variables related to a position command and variables related to position feedback information of a second servo control unit related to the axis generating the interference, and the machine learning method comprising the steps of:

acquiring state information including first servo control information of the first servo control unit, second servo control information of the second servo control unit, and coefficients for each of the position error compensation unit, the velocity command compensation unit, and the torque command compensation unit based on the one or more functions;

outputting action information including adjustment information for adjusting of the coefficients for each of the position error compensation unit, the velocity command compensation unit, and the torque command compensation unit of the compensation units included in the state information to the compensation units;

outputting a reward value each time an action is executed based on the adjusting of the coefficients for reinforcement learning using an evaluation function serving as a function of the first servo control information; and updating a value function related to the adjustment information of the coefficients based on the reward value, the state information, and the action information.

9. The machine learning method according to claim 8, wherein the machine learning device outputs the adjustment information for adjusting of the coefficients included in the state information based on the updated value function, and outputs the adjustment information to the compensation units.

* * * * *